(12) United States Patent
Oh

(10) Patent No.: US 12,054,031 B2
(45) Date of Patent: Aug. 6, 2024

(54) COOLANT CIRCULATION SYSTEM OF VEHICLE

(71) Applicants: Hyundai Motor Company, Seoul (KR); Kia Corporation, Seoul (KR)

(72) Inventor: Man Ju Oh, Gyeonggi-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 233 days.

(21) Appl. No.: 17/729,245

(22) Filed: Apr. 26, 2022

(65) Prior Publication Data

US 2023/0065903 A1 Mar. 2, 2023

(30) Foreign Application Priority Data

Aug. 27, 2021 (KR) .................... 10-2021-0113872

(51) Int. Cl.
| | |
|---|---|
| *B60H 1/00* | (2006.01) |
| *B60H 1/14* | (2006.01) |
| *B60L 58/26* | (2019.01) |
| *B60L 58/27* | (2019.01) |

(52) U.S. Cl.
CPC ......... *B60H 1/00278* (2013.01); *B60H 1/143* (2013.01); *B60L 58/26* (2019.02); *B60H 2001/00307* (2013.01); *B60H 2001/00928* (2013.01); *B60L 58/27* (2019.02)

(58) Field of Classification Search
CPC ......... B60L 58/26; B60L 58/27; B60L 53/302
See application file for complete search history.

(56) References Cited

U.S. PATENT DOCUMENTS

| | | | | |
|---|---|---|---|---|
| 4,444,024 A | * | 4/1984 | McFee | F25B 29/00 |
| | | | | 62/401 |
| 5,909,099 A | * | 6/1999 | Watanabe | A61K 31/728 |
| | | | | 320/108 |
| 9,527,403 B2 | * | 12/2016 | Mardall | B60L 53/35 |
| 10,259,333 B2 | * | 4/2019 | Lindholm | H02J 7/00309 |
| 10,882,409 B2 | * | 1/2021 | Nakaso | B60L 53/18 |
| 11,180,044 B2 | * | 11/2021 | Maeshiro | B60L 53/302 |
| 11,292,363 B2 | * | 4/2022 | Shimauchi | B60L 53/16 |
| 11,515,586 B2 | * | 11/2022 | Guerra | H01M 10/663 |

(Continued)

FOREIGN PATENT DOCUMENTS

KR 10-1994-0015176 7/1994

*Primary Examiner* — Nelson J Nieves
(74) *Attorney, Agent, or Firm* — MORGAN, LEWIS & BOCKIUS LLP

(57) ABSTRACT

In a coolant circulation system of a vehicle, a connecting unit is connected to a coolant line of a vehicle circulating through a battery of the vehicle. When connected to the coolant line, the connecting unit allows coolant to be discharged from the vehicle or be introduced into the coolant line. A supply unit includes a cooling tank in which the coolant is stored or circulates and a heating tank. The cooling tank includes an evaporation core, and the heating tank includes a condensing core. The evaporation core and the condensing core are connected to the coolant line on which a compressor, an expansion valve, and an external condenser are provided. When the connecting unit is connected to the coolant line, the supply unit is configured to supply the coolant from the cooling tank or the heating tank to the coolant line of the vehicle, cooling or heating the battery.

10 Claims, 5 Drawing Sheets

(56) References Cited

U.S. PATENT DOCUMENTS

| | | | |
|---|---|---|---|
| 11,710,868 B2* | 7/2023 | Rogers | H01M 10/486 |
| | | | 180/68.1 |
| 11,890,956 B2* | 2/2024 | Ding | B60L 53/305 |
| 2010/0089669 A1* | 4/2010 | Taguchi | B60L 58/15 |
| | | | 180/65.1 |
| 2013/0029193 A1* | 1/2013 | Dyer | B60L 53/302 |
| | | | 180/65.21 |
| 2015/0306974 A1* | 10/2015 | Mardall | H01M 10/625 |
| | | | 429/120 |
| 2017/0088007 A1* | 3/2017 | Melendez | B60L 53/302 |
| 2017/0088008 A1* | 3/2017 | Melendez | B60L 58/21 |
| 2017/0096073 A1* | 4/2017 | Mardall | B60L 58/24 |
| 2019/0061543 A1* | 2/2019 | Jovet | B60L 53/302 |
| 2019/0241093 A1* | 8/2019 | Shimauchi | H01M 10/613 |
| 2020/0217572 A1* | 7/2020 | Shafir | A23G 9/083 |
| 2021/0013559 A1* | 1/2021 | Lee | B60L 53/18 |
| 2022/0348051 A1* | 11/2022 | Chen | B60L 1/003 |
| 2022/0396165 A1* | 12/2022 | Almkvist | B60H 1/00328 |

\* cited by examiner

COOLANT CIRCULATION SYSTEM OF VEHICLE

CROSS REFERENCE TO RELATED APPLICATION

The present application claims priority to Korean Patent Application No. 10-2021-0113872, filed Aug. 27, 2021, the entire contents of which is incorporated herein for all purposes by this reference.

BACKGROUND OF THE PRESENT DISCLOSURE

Field of the Present Disclosure

The present disclosure relates to a coolant circulation system of a vehicle, the system being configured for thermal management of a high voltage battery provided in an electric vehicle, wherein a supply unit of the system provided outside the vehicle is connected to a coolant line circulating through the high voltage battery of the vehicle through a connecting unit to supply cooled or heated coolant to the high voltage battery.

Description of Related Art

Recently, technological development of electric vehicles has been actively undertaken. In electric vehicles, technology regarding thermal management of high voltage batteries is attracting attention. High voltage batteries provided as power source of conventional internal combustion engine (ICE) vehicles are more sensitive to temperature than the engines. When a high voltage battery is overheated, the battery may be damaged due to deterioration and power efficiency of the battery may be significantly reduced. Accordingly, an electric vehicle is provided with a high voltage battery coolant line for efficient thermal management of a high voltage battery.

Furthermore, both when a vehicle is driven using a high voltage battery and when the high voltage battery is charged, heat is generated. When the high voltage battery is charged rapidly, a greater amount of heat may be generated, deteriorating the high voltage battery or reducing charging efficiency. Furthermore, when the high voltage battery is charged at a low ambient temperature, the charging efficiency may also be reduced.

Accordingly, there has been demanded the development of a coolant circulation system of a vehicle, the system being connected to a stopped electric vehicle in a special environment, for example, when a high voltage battery is being charged, to exchange coolant with a coolant line and cool or heat the coolant, improving the charging efficiency, thermal efficiency, or the like of the high voltage battery.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a coolant circulation system of a vehicle. In the coolant circulation system, a supply unit provided outside the vehicle is connected to a coolant line circulating through a high voltage battery of the vehicle through a connecting unit. in accordance with the temperature of coolant exiting the coolant line or cooling or warming mode of the high voltage battery, cooled or heated coolant is supplied from a cooling tank or a heating tank of the supply unit to the high voltage battery, cooling or warming the high voltage battery.

In various aspects of the present disclosure, a coolant circulation system of a vehicle may include: a connecting unit provided outside a vehicle and configured to be connected to a coolant line of the vehicle circulating through a battery of the vehicle. When connected to the coolant line, the connecting unit may allow coolant to be discharged from the vehicle or be introduced into the coolant line. The coolant circulation system may also include a supply unit provided outside the vehicle and including a cooling tank in which the coolant is stored or circulates and a heating tank. The cooling tank may include an evaporation core, and the heating tank may include a condensing core. The evaporation core and the condensing core may be connected to the coolant line on which a compressor, an expansion valve, and an external condenser are provided. When the connecting unit is connected to the coolant line, the supply unit may supply the coolant from the cooling tank or the heating tank to the coolant line of the vehicle, cooling or heating the battery.

The coolant circulation system may further include a measuring unit provided between the supply unit and the connecting unit to measure a temperature of the coolant exiting the coolant line through the connecting unit.

The supply unit may determine the temperature of coolant supplied to the coolant line of the vehicle from the cooling tank or the heating tank in accordance with the temperature of the coolant measured by the measuring unit.

The measuring unit may include a temperature detector measuring the initial temperature of the coolant in a measuring tank or introduced to the measuring tank. The temperature detector may determine the temperature of the coolant to be supplied to the coolant line of the vehicle or a cooling mode or a warming mode of the battery in accordance with the initial temperature of the coolant measured by the temperature detector.

The heating tank and a first control valve connected to an upstream portion of the heating tank may be provided downstream of the measuring unit. The first control valve may control a flow or a flow rate of the coolant moving from the measuring unit to the cooling tank or the heating tank depending on the temperature of the coolant to be supplied to the coolant line or cooling mode or warming mode of the battery.

A downstream portion of the cooling tank and a downstream portion of the heating tank may be connected to an upstream portion of the connecting unit, allowing the supply unit to be connected to the coolant line of the vehicle.

The cooling tank and a second control valve connected to the downstream portion of the heating tank may be provided upstream of the connecting unit of the coolant circulation system. The second control valve may control a flow or a flow rate of the coolant moving from the cooling tank or the heating tank to the connecting unit depending on the temperature of the coolant to be supplied to the coolant line or cooling mode or warming mode of the battery.

The coolant line allows the coolant, which has passed through the condensing core or the external condenser from the compressor, to be introduced to the compressor sequentially through the expansion valve and the evaporation core.

The coolant flowing along the coolant line may be compressed in the compressor depending on the temperature of the coolant to be supplied to the coolant line or the cooling mode or the warming mode of the battery, condensed in the condensing core or the external condenser, expanded in the expansion valve, and evaporated in the evaporation core, so that the coolant in the cooling tank is cooled or the coolant in the heating tank is heated.

The connecting unit may be connected to an upstream portion or a downstream portion of a reservoir tank or a point including the upstream or the downstream of the battery.

In the coolant circulation system of a vehicle according to an exemplary embodiment of the present disclosure, the supply unit provided outside the vehicle is connected to a coolant line circulating through a high voltage battery of the vehicle through a connecting unit. Depending on the temperature of coolant exiting the coolant line or cooling or warming mode of the high voltage battery, cooled or heated coolant may be supplied from a cooling tank or a heating tank of the supply unit to the high voltage battery, cooling or warming the high voltage battery.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
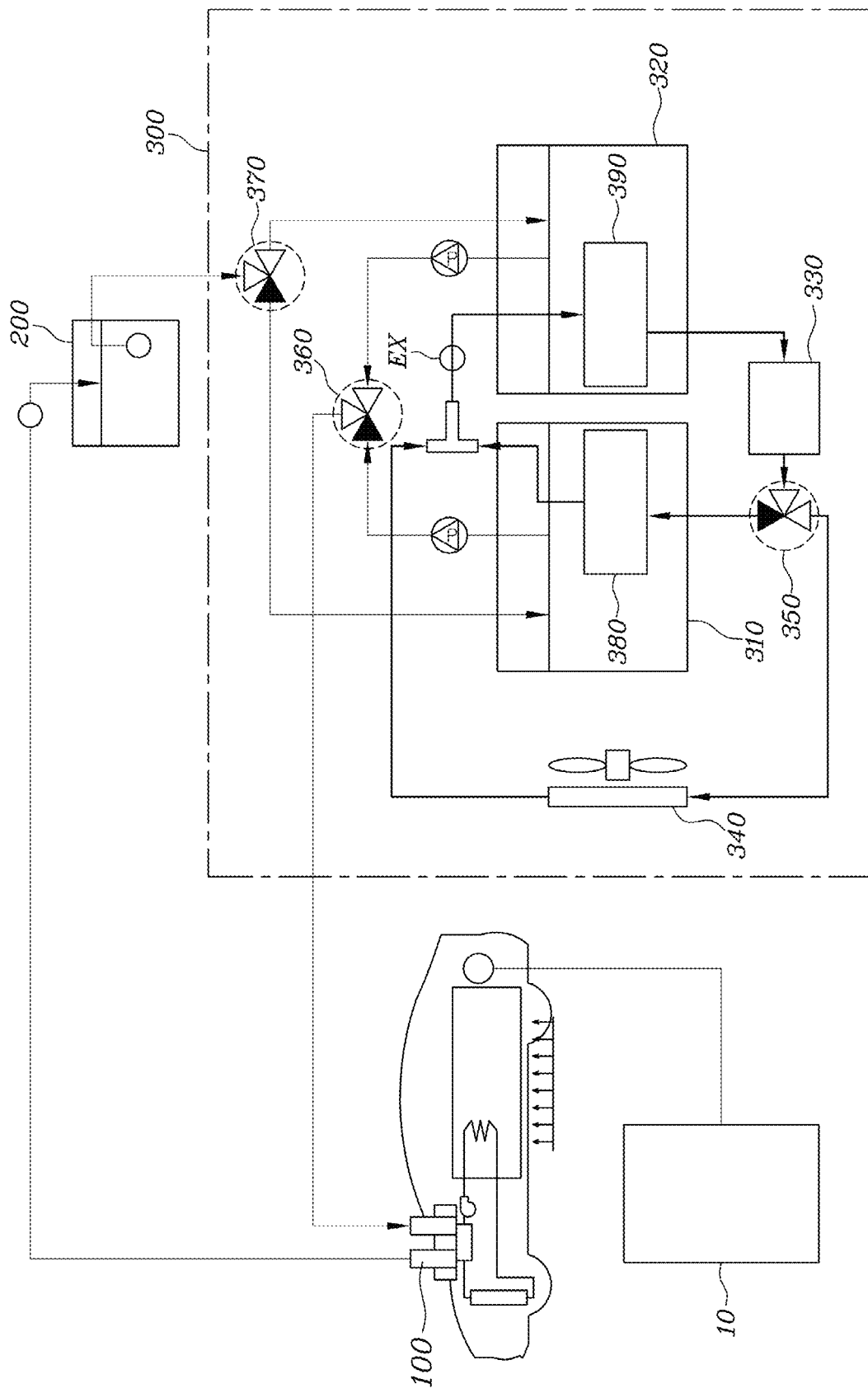
FIG. 1 is a circuit diagram illustrating a coolant circulation system of a vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Figure 2:
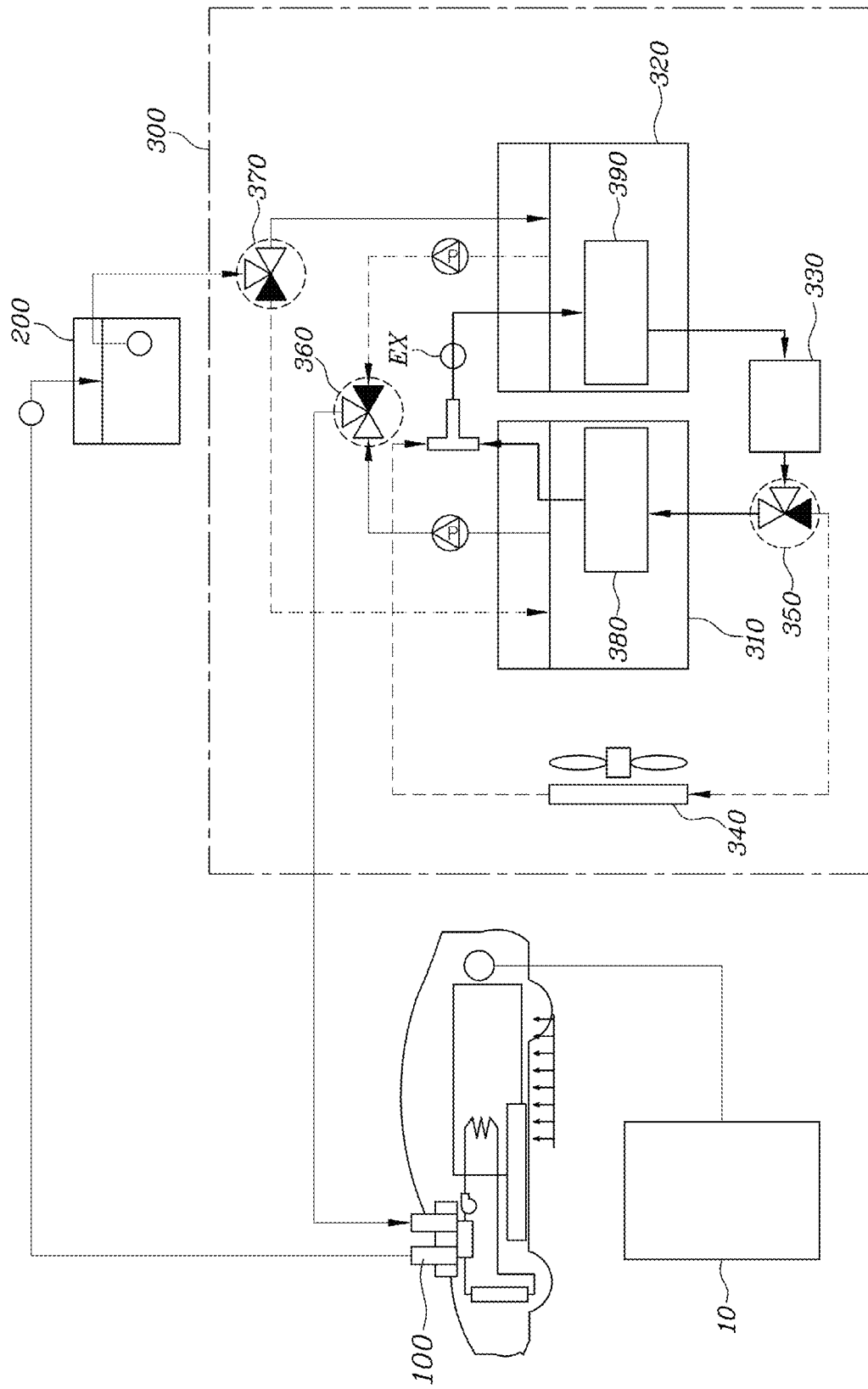
FIG. 2 is a circuit diagram illustrating an operation of raising the temperature of a battery at an early stage of battery charging in an extreme cold condition in the coolant circulation system of a vehicle according to various exemplary embodiments of the present disclosure.
Figure 3:
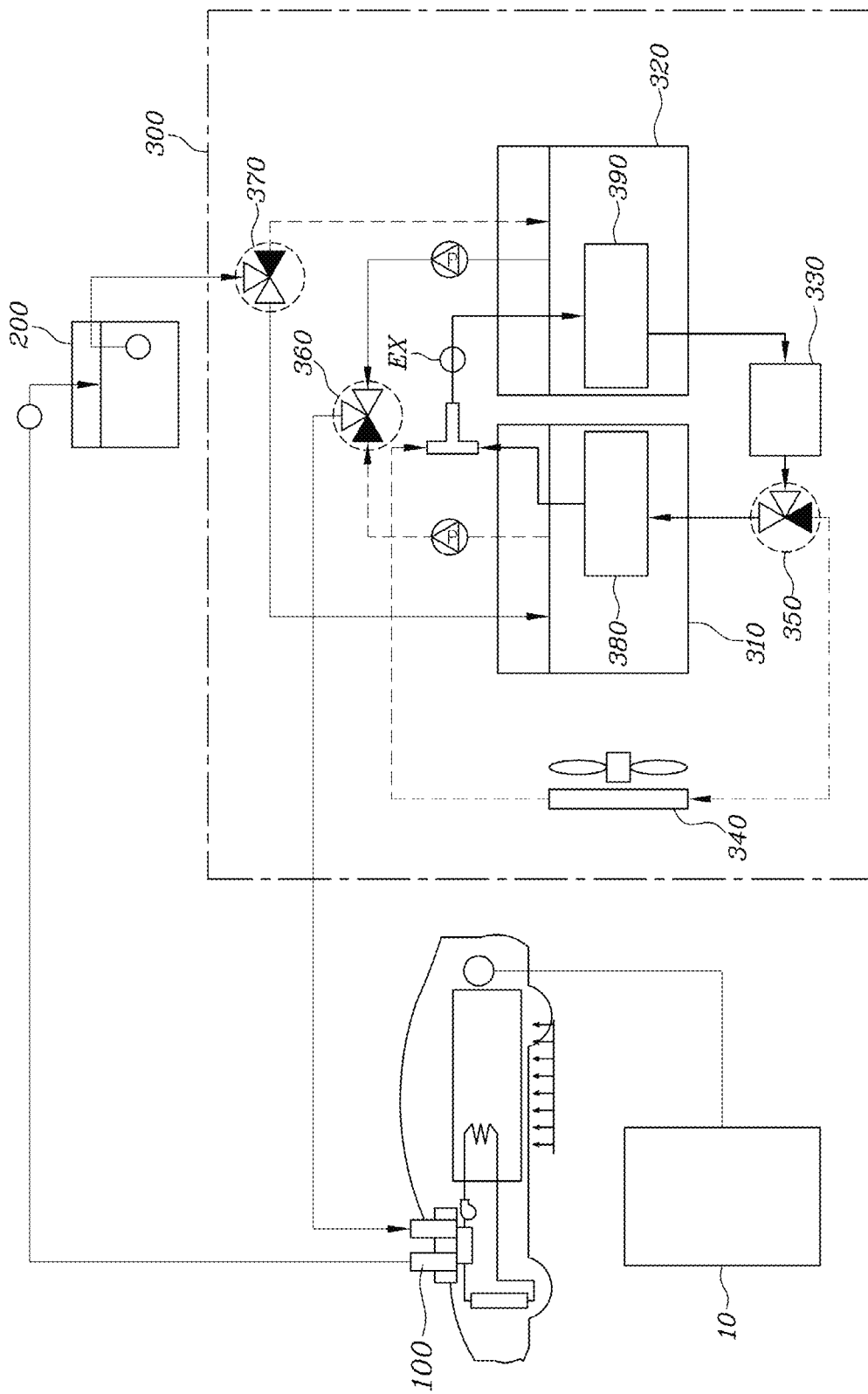
FIG. 3 is a circuit diagram illustrating an operation of cooling the battery at middle and late stages of the battery charging in the extreme cold condition in the coolant circulation system of a vehicle according to various exemplary embodiments of the present disclosure.
Figure 4:
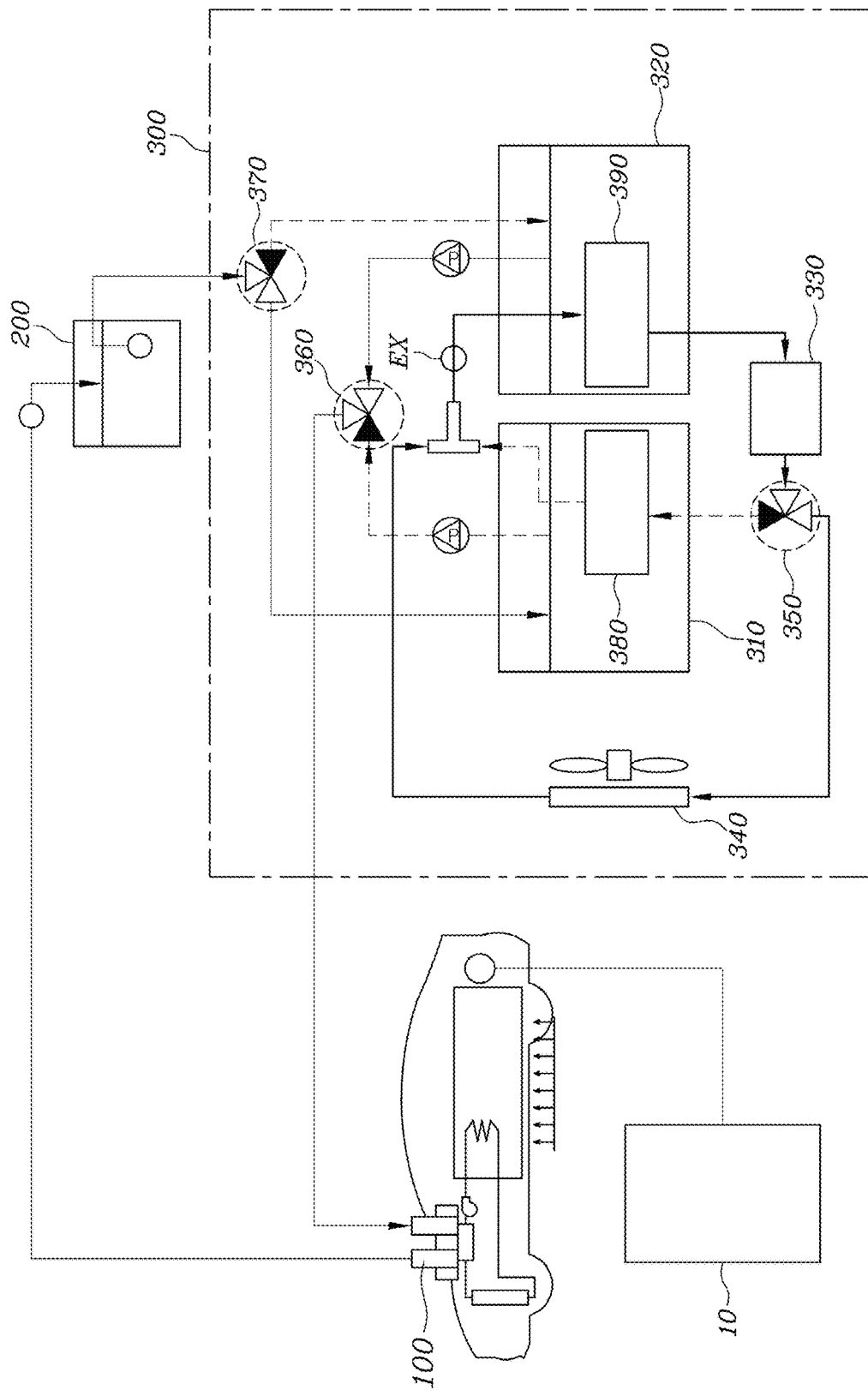
FIG. 4 is a circuit diagram illustrating an operation of cooling the battery in an extreme hot condition in the coolant circulation system of a vehicle according to various exemplary embodiments of the present disclosure.
Figure 5:
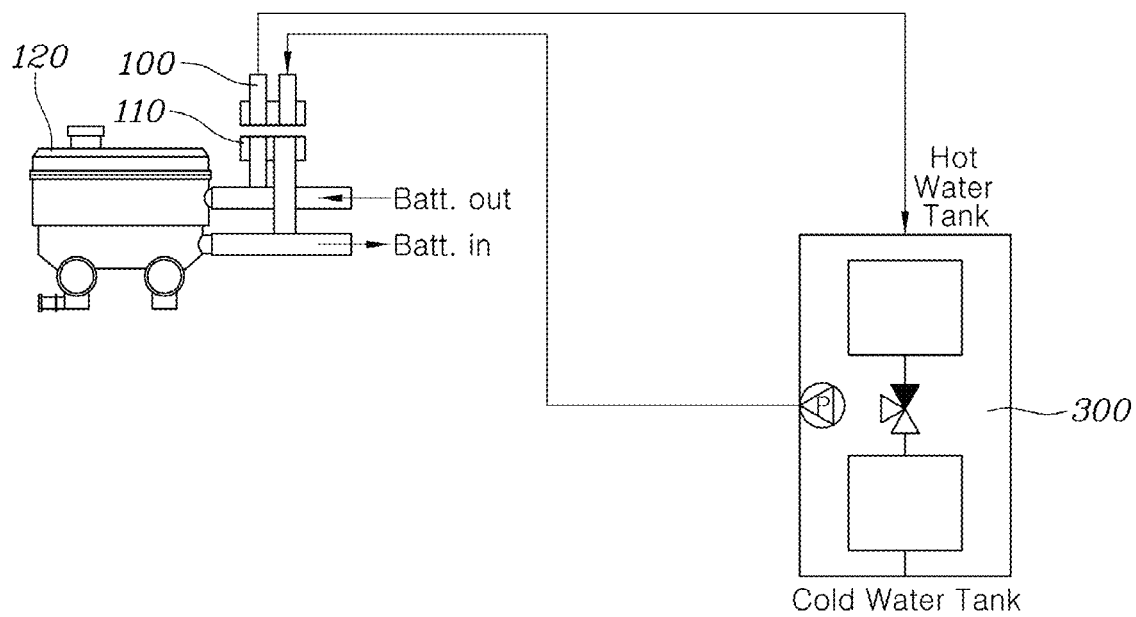
FIG. 5 is a schematic view exemplarily illustrating the connecting unit of the coolant circulation system of a vehicle according to various exemplary embodiments of the present disclosure, the connecting unit being connected to a vehicle battery.

FIG. 1 is a circuit diagram illustrating a coolant circulation system of a vehicle according to various exemplary embodiments of the present disclosure, FIG. 2 is a circuit diagram illustrating an operation of raising the temperature of a battery at an early stage of battery charging in an extreme cold condition in the coolant circulation system of a vehicle according to various exemplary embodiments of the present disclosure, FIG. 3 is a circuit diagram illustrating an operation of cooling the battery at middle and late stages of the battery charging in the extreme cold condition in the coolant circulation system of a vehicle according to various exemplary embodiments of the present disclosure, FIG. 4 is a circuit diagram illustrating an operation of cooling the battery in an extreme hot condition in the coolant circulation system of a vehicle according to various exemplary embodiments of the present disclosure, and FIG. 5 is a schematic view exemplarily illustrating the connecting unit of the coolant circulation system of a vehicle according to various exemplary embodiments of the present disclosure, the connecting unit being connected to a vehicle battery.

FIG. 1 is a circuit diagram illustrating the coolant circulation system of a vehicle according to various exemplary embodiments of the present disclosure. The coolant circulation system of a vehicle according to various exemplary embodiments of the present disclosure includes a connecting unit 100 and a supply unit 300. The connecting unit 100 is provided outside a vehicle and configured to be connected to a coolant line of the vehicle circulating through a battery of the vehicle. When connected to the coolant line, the connecting unit 100 may allow coolant to be discharged from the vehicle or be introduced into the coolant line. The supply unit 300 is provided outside the vehicle, and includes a cooling tank 320 in which the coolant is stored or circulates and a heating tank 310. An evaporation core 390 is provided on the cooling tank 320, and a condensing core 380 is provided on the heating tank 310. The evaporation core 390 and the condensing core 380 are connected to the coolant line on which a compressor 330, an expansion valve EX, and an external condenser 340 are provided. When the connecting unit 100 is connected to the coolant line, the supply unit 300 supplies the coolant from the cooling tank 320 or the heating tank 310 to the coolant line of the vehicle, cooling or heating the battery.

In an electric vehicle, the battery is charged using a rapid charger 10 provided outside the vehicle. Here, a decrease in the rapid charging time of the electric vehicle is a significantly important factor regarding salability. In the rapid charging, the temperature of the battery must be raised to a predetermined temperature or higher so that charging amperage may be increased. After the battery has arrived at the predetermined temperature or higher, the battery needs to be cooled rapidly, because the temperature of the battery is increased by the heat thereof. In the instant case, to heat and cool the battery, the vehicle requires a heater and a compressor having a high capacity. Due to limited capacity and in terms of cost reduction, it is not preferable that the heater and the compressor are provided in the vehicle. The heater and the compressor provided in the vehicle serve as heavy weights when the charging is not performed, disadvantageously having an adverse effect on energy efficiency of the vehicle.

Thus, when the vehicle battery is charged, the coolant circulation system of a vehicle according to various exemplary embodiments of the present disclosure can supply cooled or heated coolant to the coolant line of the vehicle battery depending on the internal or external environment of the vehicle. That is, in an extreme cold condition, the temperature of the battery may be raised at an early stage of the charging, increasing the efficiency of charging. After the temperature has been raised sufficiently, the battery is cooled to prevent the temperature of the battery from being raised. Furthermore, in an extreme hot condition, the battery may be cooled, increasing the efficiency of charging and preventing the battery from being overheated.

FIG. 2 is a circuit diagram illustrating an operation of raising the temperature of a battery at an early stage of battery charging in an extreme cold condition in the coolant circulation system of a vehicle according to various exemplary embodiments of the present disclosure, FIG. 3 is a circuit diagram illustrating an operation of cooling the battery at middle and late stages of the battery charging in the extreme cold condition in the coolant circulation system of a vehicle according to various exemplary embodiments of the present disclosure, and FIG. 4 is a circuit diagram illustrating an operation of cooling the battery in an extreme hot condition in the coolant circulation system of a vehicle according to various exemplary embodiments of the present disclosure. The coolant circulation system of a vehicle according to various exemplary embodiments of the present disclosure may further include a measuring unit 200 provided between the supply unit 300 and the connecting unit 100 to measure the temperature of coolant exiting the coolant line through the connecting unit 100.

In the coolant circulation system of a vehicle according to various exemplary embodiments of the present disclosure, the supply unit 300 may determine the temperature of coolant supplied to the coolant line of the vehicle from the cooling tank 320 or the heating tank 310 based on the temperature of the coolant measured by the measuring unit 200.

Furthermore, in the coolant circulation system of a vehicle according to various exemplary embodiments of the present disclosure, the measuring unit 200 includes a temperature detector measuring the initial temperature of coolant in a measuring tank or introduced to the measuring tank. The temperature detector may determine the temperature of the coolant to be supplied to the coolant line of the vehicle or a cooling mode or a warming mode of the battery based on the initial temperature of the coolant measured by the temperature detector. The measuring unit 200 measures the temperature of the coolant after the early stage of the coolant being taken into the vehicle. The supply unit 300 may receive information regarding the initial temperature of the coolant, the ambient air temperature of the vehicle, and the state of charge (SOC) value of the battery, determine the temperature of the coolant to be supplied into the coolant line of the vehicle, determine the cooling mode or the warming mode by determining whether the battery needs to be cooled or heated, and supply the coolant cooled or heated thereby to the coolant line, improving the charging efficiency of the battery.

Furthermore, in the coolant circulation system of a vehicle according to various exemplary embodiments of the present disclosure, the heating tank 310 and a first control valve 370 connected to the upstream of the heating tank 310 are provided downstream of the measuring unit 200. The first control valve 370 may control the flow or the flow rate of the coolant moving from the measuring unit 200 to the cooling tank 320 or the heating tank 310 depending on the temperature of the coolant to be supplied to the coolant line or the cooling mode or the warming mode of the battery.

Furthermore, in the supply unit 300 of the coolant circulation system of a vehicle according to various exemplary embodiments of the present disclosure, the downstream of the cooling tank 320 and the downstream of the heating tank 310 may be connected to the upstream of the connecting unit 100, allowing the supply unit 300 to be connected to the coolant line of the vehicle.

The cooling tank 320 and a second control valve 360 connected to the downstream of the heating tank 310 are provided upstream of the connecting unit 100 of the coolant circulation system of a vehicle according to various exemplary embodiments of the present disclosure. The second control valve 360 may control the flow or the flow rate of the coolant moving from the cooling tank 320 or the heating tank 310 to the connecting unit 100 depending on the temperature of the coolant to be supplied to the coolant line or the cooling mode or the warming mode of the battery.

Furthermore, in the coolant circulation system of a vehicle according to various exemplary embodiments of the present disclosure, the coolant line may allow the coolant, which has passed through the condensing core 380 or the external condenser 340 from the compressor 330, to be introduced to the compressor 330 sequentially through the expansion valve EX and the evaporation core 390.

The coolant flowing along the coolant line of the coolant circulation system of a vehicle according to various exemplary embodiments of the present disclosure may be compressed in the compressor 330 depending on the temperature of the coolant to be supplied to the coolant line or the cooling mode or the warming mode of the battery, condensed in the condensing core 380 or the external condenser 340, expanded in the expansion valve EX, and evaporated in the evaporation core 390. Consequently, the coolant in the cooling tank 320 may be cooled, or the coolant in the heating tank 310 may be heated.

That is, referring to FIG. 2, at the early stage of the charging of the battery during the winter, the coolant is introduced into the cooling tank 320. A coolant cycle is activated in the coolant line so that the coolant is compressed in the compressor, condensed in the condensing core 380, expanded in the expansion valve EX, and evaporated in the evaporation core 390. Consequently, the coolant in the heating tank 310 is heated, and accordingly, the heated coolant is supplied to the coolant line, raising the temperature of the battery.

Furthermore, referring to FIG. 3, at the middle and late stages of the charging of the battery during the winter, the warm coolant is introduced into the heating tank 310. In the coolant line, the coolant cycle is activated so that the coolant is compressed in the compressor, condensed in the condensing core 380, expanded in the expansion valve EX, and evaporated in the evaporation core 390. Consequently, the coolant of the cooling tank 320 is cooled, and accordingly, the cooled coolant is supplied to the coolant line of the vehicle, cooling the battery.

Furthermore, referring to FIG. 4, in the case of charging of the battery during the summer, the coolant of the vehicle may maintain a high temperature both before and after the charging. Thus, the coolant of the vehicle having a high temperature is introduced into the heating tank 310. The coolant cycle is activated in the coolant line so that the coolant is compressed in the compressor 330, is condensed in the external condenser 340 in operation of a third control valve 350, is expanded in the expansion valve EX, and is evaporated in the evaporation core 390. Consequently, the coolant of the cooling tank 320 is cooled, and accordingly, the cooled coolant is supplied to the coolant line of the vehicle, cooling the battery.

FIG. 5 is a schematic view exemplarily illustrating the connecting unit of the coolant circulation system of a vehicle according to various exemplary embodiments of the present disclosure, the connecting unit being connected to a vehicle battery. Furthermore, in the coolant circulation system of a vehicle according to various exemplary embodiments of the present disclosure, the connecting unit 100 may be connected to the upstream or the downstream of a reservoir tank 120 or a point 110 including the upstream or the downstream of the battery.

In various exemplary embodiments of the present disclosure, a controller is connected to at least one of the elements of the coolant circulation system to control the operations thereof.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A coolant circulation system of a vehicle, the system comprising:
   a connecting unit provided outside a vehicle and configured to be connected to a coolant line of the vehicle, the coolant line circulating a coolant through a battery of the vehicle, wherein, when connected to the coolant line, the connecting unit allows the coolant to be discharged from the vehicle or be introduced into the coolant line; and
   a supply unit provided outside the vehicle and including:
     a cooling tank in which a coolant is stored or circulates; and
     a heating tank,
     wherein the cooling tank includes an evaporation core, and the heating tank includes a condensing core,
     wherein the evaporation core and the condensing core are connected to the coolant line on which a compressor, an expansion valve, and an external condenser are provided,
     wherein when the connecting unit is connected to the coolant line, the supply unit is configured to supply the coolant from the cooling tank or the heating tank to the coolant line of the vehicle, cooling or heating the battery,
     wherein a downstream portion of the cooling tank and a downstream portion of the heating tank are connected to an upstream portion of the connecting unit, allowing the supply unit to be connected to the coolant line of the vehicle, wherein the cooling tank and a single second control valve connected to the downstream portion of the heating tank are provided upstream of the connecting unit, and wherein a first port of the second control valve is connected to the downstream portion of the heating tank, a second port of the second control valve is connected to the connection unit and a third port of the second control valve is connected to an upstream portion of the cooling tank.

2. The coolant circulation system of claim 1, further including a measuring unit provided between the supply unit and the connecting unit to measure a temperature of the coolant exiting the coolant line through the connecting unit.

3. The coolant circulation system of claim 2,
wherein the measuring unit includes a temperature detector measuring an initial temperature of the coolant in the measuring unit or introduced to the measuring unit.

4. The coolant circulation system of claim 1,
wherein the heating tank and a first control valve connected to an upstream portion of the heating tank are provided downstream of the measuring unit.

5. The coolant circulation system of claim 4,
wherein a first port of the first control valve is connected to the upstream portion of the heating tank, a second port of the first control valve is connected to the measurement unit and a third port of the first control valve is connected to the upstream portion of the cooling tank.

6. The coolant circulation system of claim 1, wherein the coolant line allows the coolant, which has passed through the condensing core or the external condenser from the compressor, to be introduced to the compressor sequentially through the expansion valve and the evaporation core.

7. The coolant circulation system of claim 6, wherein the coolant flowing along the coolant line is compressed in the compressor depending on a temperature of the coolant to be supplied to the coolant line or a cooling mode or a warming mode of the battery, condensed in the condensing core or the external condenser, expanded in the expansion valve, and evaporated in the evaporation core, so that the coolant in the cooling tank is cooled or the coolant in the heating tank is heated.

8. The coolant circulation system of claim 1, wherein a first portion of the condensing core and a first portion of the compressor connected to a first portion of the evaporation core are connected to a first portion of the external condenser via a third control valve.

9. The coolant circulation system of claim 8, wherein a second portion of the condensing core and a second portion of the evaporation core are connected to a second portion of the external condenser.

10. The coolant circulation system of claim 1, wherein the connecting unit is connected to an upstream portion or a downstream portion of a reservoir tank or a point including upstream or downstream of the battery.

* * * * *